United States Patent
Liao et al.

(10) Patent No.: US 6,722,239 B2
(45) Date of Patent: Apr. 20, 2004

(54) SCROLL SAWING MACHINE WITH A SAWDUST COLLECTING MECHANISM

(76) Inventors: Juei-Seng Liao, No. 295, Sec. 1, Nanking E. Rd., Taichung City (TW); Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 29 days.

(21) Appl. No.: 10/191,104

(22) Filed: Jul. 9, 2002

(65) Prior Publication Data

US 2003/0209120 A1 Nov. 13, 2003

(30) Foreign Application Priority Data

May 10, 2002 (TW) ........................... 91206678 U

(51) Int. Cl.⁷ ................................................ B26D 7/18
(52) U.S. Cl. ........................ 83/100; 83/167; 83/168; 83/662; 83/758; 83/784; 144/252.1
(58) Field of Search ..................... 83/100, 167, 753, 83/755, 758, 769, 783, 784, 786, 662, 697, 198

(56) References Cited

U.S. PATENT DOCUMENTS

| | | | | |
|---|---|---|---|---|
| 2,579,955 A | * | 12/1951 | Orescan | 83/100 |
| 4,367,665 A | * | 1/1983 | Terpstra et al. | 83/100 |
| 5,235,890 A | * | 8/1993 | Mathre | 83/784 |
| 5,445,056 A | * | 8/1995 | Folci | 83/100 |
| 5,884,544 A | * | 3/1999 | Theising et al. | 83/100 |
| 6,293,321 B1 | * | 9/2001 | Chiang | 144/252.1 |
| 6,470,778 B1 | * | 10/2002 | Kaye et al. | 83/100 |

* cited by examiner

Primary Examiner—Boyer D. Ashley
(74) Attorney, Agent, or Firm—Ladas & Parry

(57) ABSTRACT

A scroll sawing machine includes a motor mounted under a table of a machine base, and a saw blade driven by a first output shaft of the motor to reciprocate in an upright direction. First and second sawdust collecting members respectively have first and second intake ports which are respectively disposed above and under the table in the vicinity of the blade so as to collect sawdust scattering around the blade and falling through a hole in the table. A blowing member includes a drive shaft coupled to and driven by a second output shaft of the motor for rotating an impeller for drawing the sawdust from the collecting members into the blowing member for discharge through a discharge port.

3 Claims, 10 Drawing Sheets

SCROLL SAWING MACHINE WITH A SAWDUST COLLECTING MECHANISM

CROSS-REFERENCE TO RELATED APPLICATION

This application claims priority of Taiwan patent Application No. 091206678, filed on May 10, 2002.

BACKGROUND OF THE INVENTION

1. Field of the Invention

This invention relates to a scroll sawing machine, more particularly to a scroll sawing machine with a sawdust collecting mechanism in which a drive shaft is coupled to and is driven by a motor thereof.

2. Description of the Related Art

Referring to FIGS. 1 to 3, a conventional scroll sawing machine 10 is shown to include a machine base 11, a table 17, a hollow blade-holding arm 12, a saw blade 166, and a blade driving device.

The blade-holding arm 12 includes an interconnecting portion 121 secured on a rear end 111 of the machine base 11, and upper and lower arm portions 122,123 extending in a longitudinal direction of the machine base 11. A pivot seat 113 is mounted on a front end 112 of the machine base 11 such that the table 17 is pivotally mounted on the pivot seat 113. An angle-adjusting member 18 is disposed to adjust an angle of the table 17 relative to the machine base 11.

The blade driving device 13 includes upper and lower swing arms 141,142 mounted respectively in the upper and lower arm portions 122,123 and coupling respectively upper and lower ends of the saw blade 166, a connecting shaft 143 pivoted to the upper and lower swing arms 141,142, a motor 131 mounted to a motor seat 132, and a pulley-and-belt transmission unit 15 disposed to couple the motor 131 to the connecting shaft 143. During sawing operation, the saw blade 166 is driven via the motor 131 to reciprocate in an upright direction through a hole 171 in the table 17 so as to saw a workpiece on the table 17. Since a large amount of sawdust is formed and the sawdust will scatter during the sawing operation, collecting means is needed to collect the sawdust.

SUMMARY OF THE INVENTION

The object of the present invention is to provide a scroll sawing machine which has a sawdust collecting mechanism to collect sawdust during a sawing operation.

According to this invention, the scroll sawing machine includes a machine base, and a table which is disposed above the machine base for placement of a workpiece to be sawn thereon. The table has a hole which extends therethrough in an upright direction. A motor is disposed under the table, and has first and second output shafts which are disposed opposite to each other in a longitudinal direction transverse to the upright direction to deliver driving forces. A saw blade extends through the hole, and has upper and lower ends opposite to each other in the upright direction. A blade-driving member includes upper and lower driving portions which are mounted respectively above and under the table and which respectively couple the upper and lower ends to the first output shaft such that, by virtue of the driving force of the first output shaft, the saw blade is put into a reciprocating motion in the upright direction.

A first sawdust collecting member confining a first sawdust passageway. The first sawdust passageway has a first intake port which is disposed above the table and in the vicinity of the hole to collect sawdust scattering around and above the table, and a first outlet port which is disposed under the table and downstream of the first intake port. A second sawdust collecting member is disposed under the table and confines a second sawdust passageway. The second sawdust passageway has a second intake port which is disposed under the table and in the vicinity of the hole to collect sawdust falling through the hole, and a second outlet port which is disposed downstream of the second intake port and adjacent to the first outlet port.

A blower casing has proximate and distal walls which are respectively proximate to and distal from the second outlet port and which are disposed opposite to each other in the longitudinal direction to confine an accommodation chamber, and a discharge port which is disposed between the proximate and distal walls and which is in communication with the accommodation chamber. The proximate wall has an inlet port which is formed therethrough and which is disposed downstream of the first and second outlet ports. A drive shaft extends in the longitudinal direction, and has a first end which is rotatably mounted on the distal wall, and a second end which extends from the first end and outwardly of the distal wall and which is coupled to and which is driven by the second output shaft. An impeller is received in the accommodation chamber, and is connected to and is driven by the first end of the drive shaft to rotate so as to draw the sawdust from the first and second sawdust collecting members into the accommodation chamber for discharge via the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
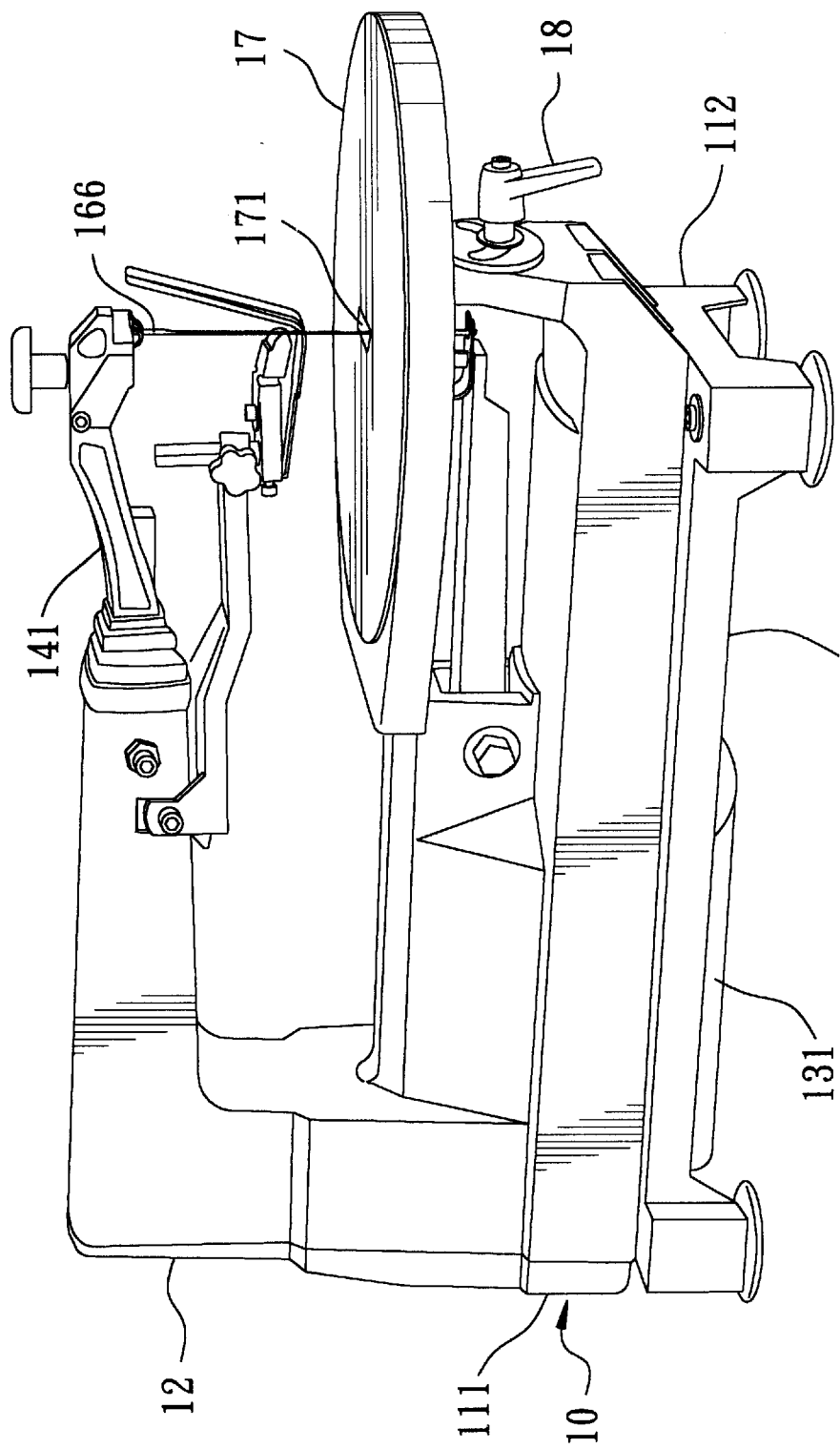
FIG. 1 is a perspective view of a conventional scroll sawing machine.
Figure 2:
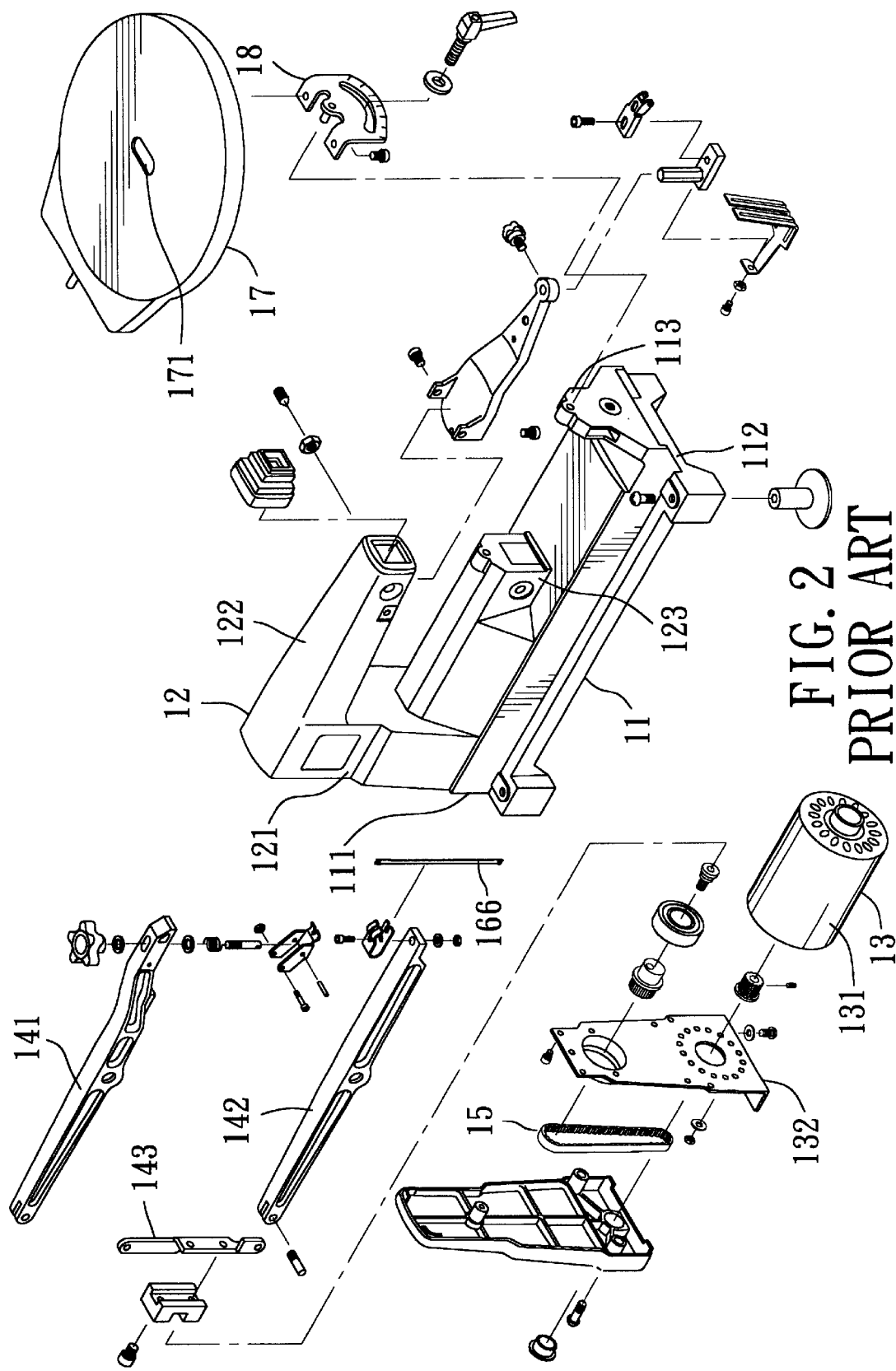
FIG. 2 is an exploded perspective view of the conventional scroll sawing machine.
Figure 3:
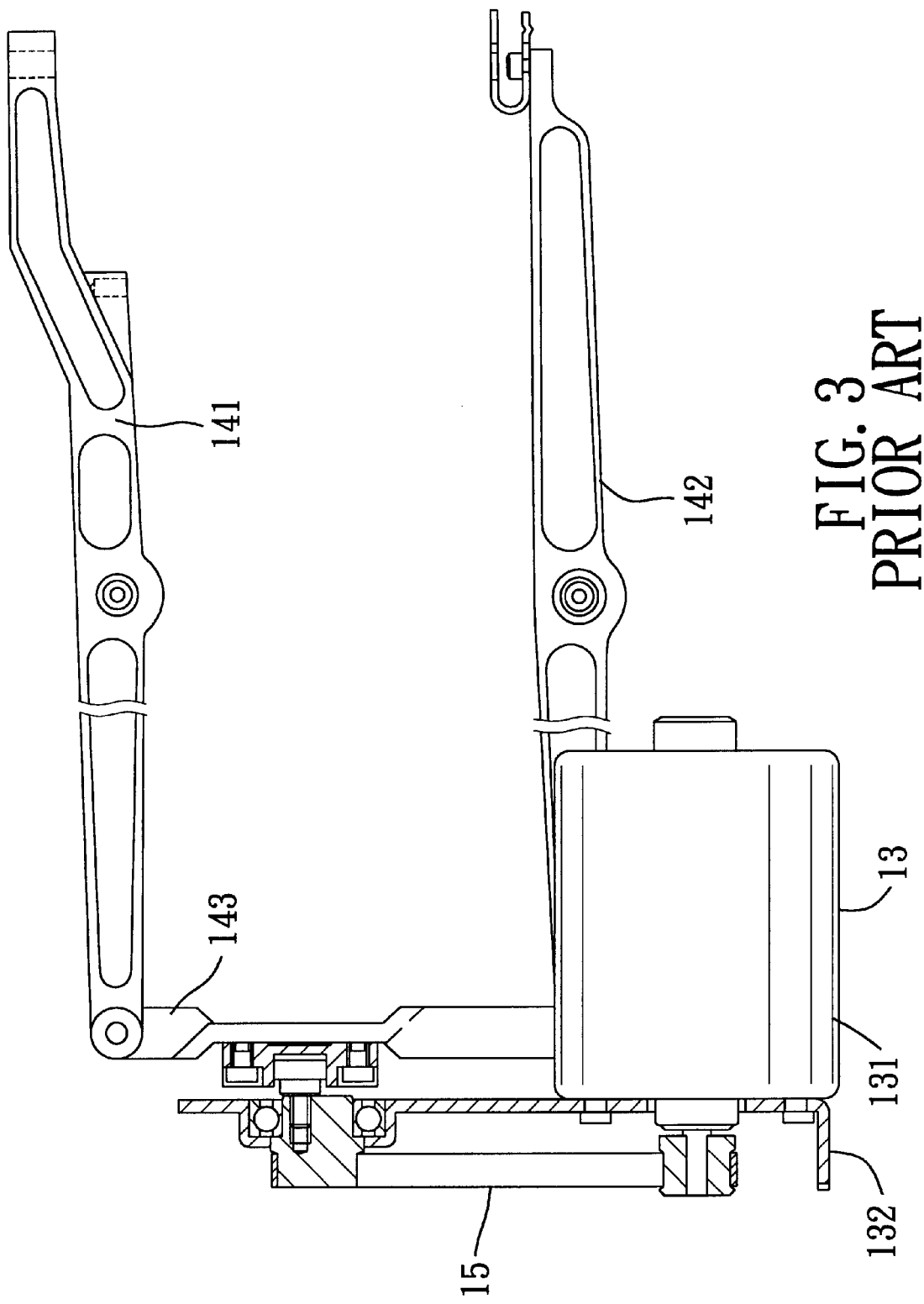
FIG. 3 is a schematic view of a portion of the conventional scroll sawing machine.
Figure 4:
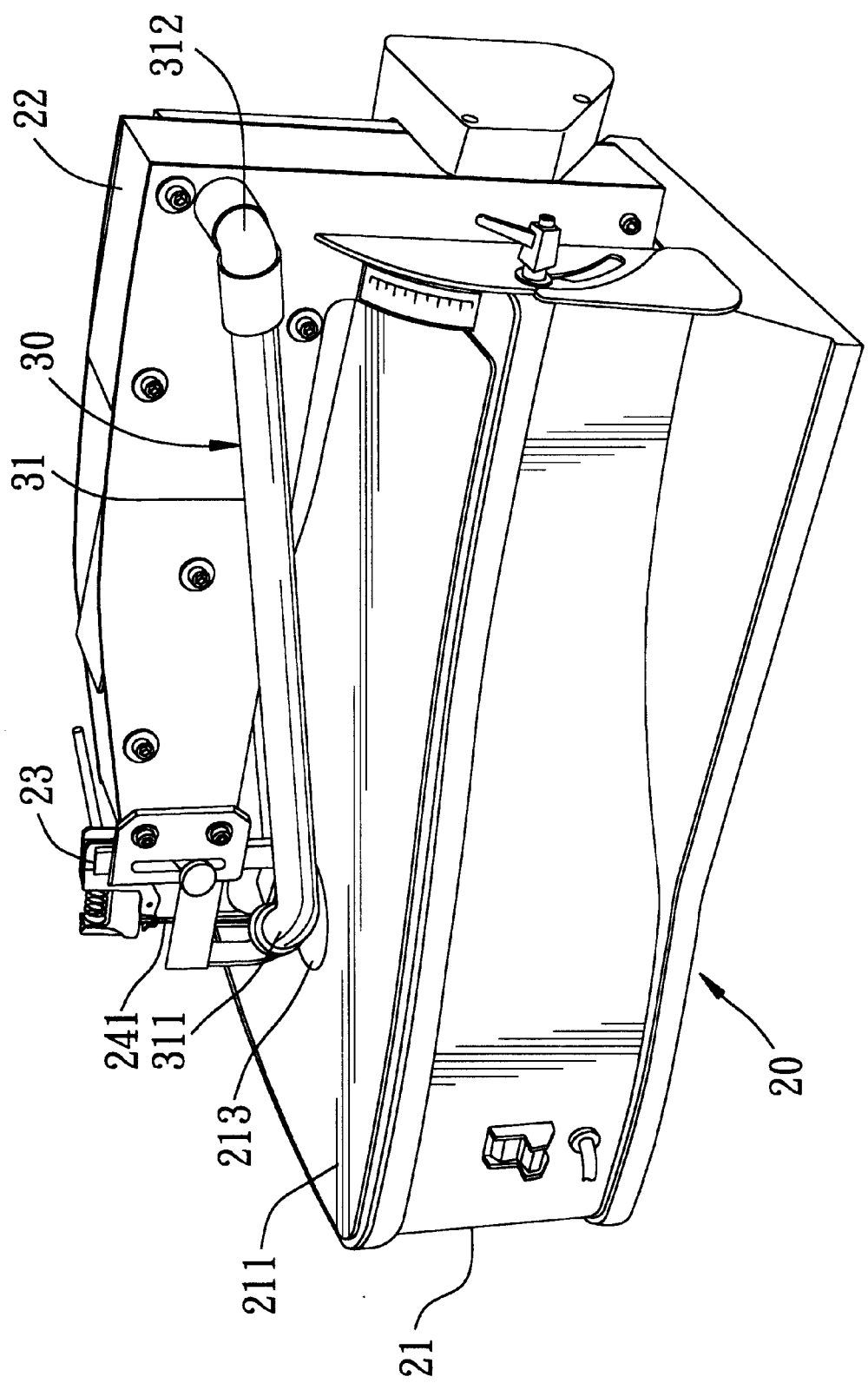
FIG. 4 is a perspective view of a preferred embodiment of a scroll sawing machine according to this invention.
Figure 5:
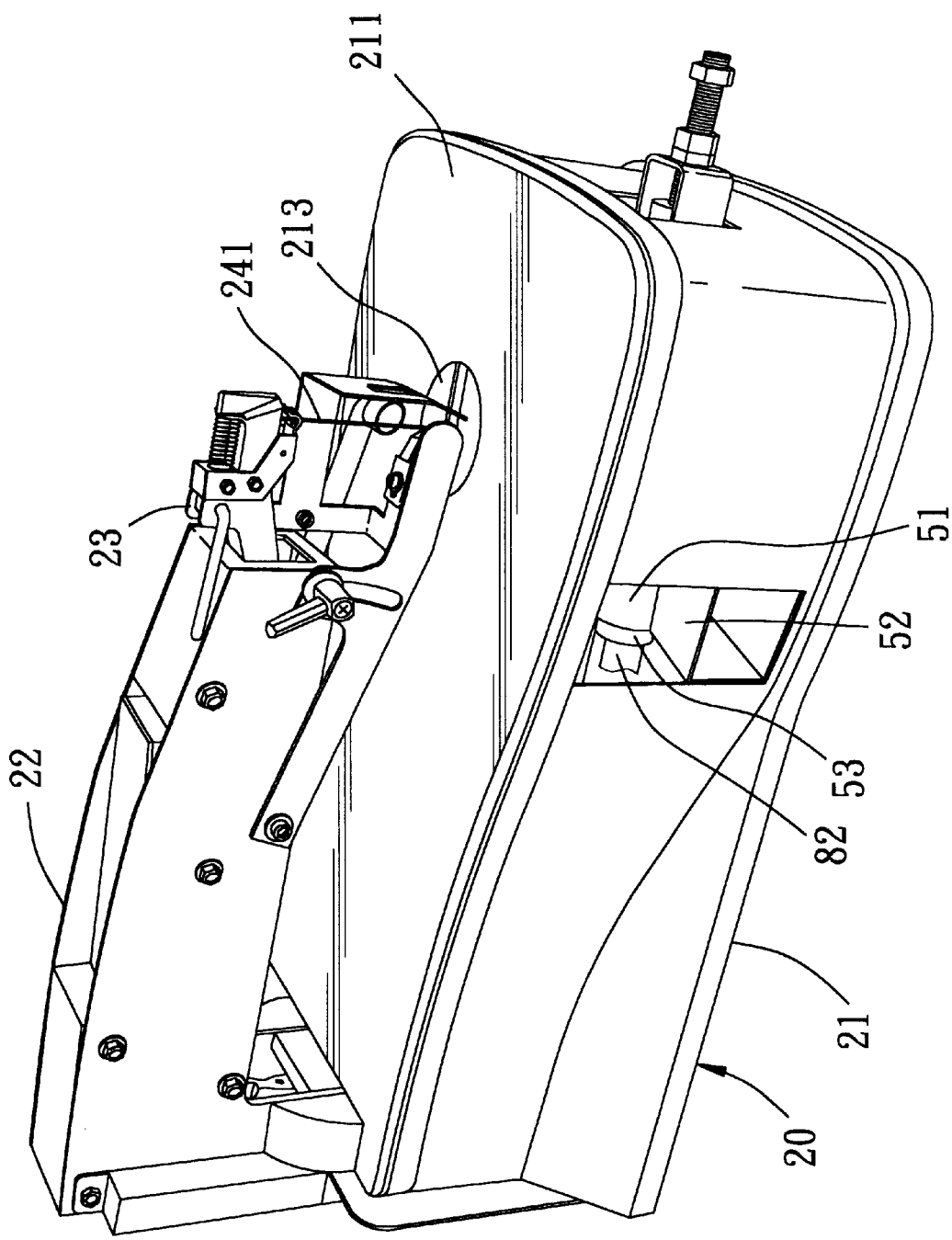
FIG. 5 is a perspective view of the preferred embodiment taken from another side.

Referring to FIGS. 4 and 5, the preferred embodiment of a scroll sawing machine 20 according to the present invention is shown to comprise a machine base 21 in form of a housing. A table 211 is disposed on a top surface of the base 21 for placement of a workpiece to be sawn thereon. The table 211 has a hole 213 which extends therethrough in an upright direction. A hollow cantilever arm 22 has a rear portion secured to an end of the base 21, and extends in a longitudinal direction transverse to the upright direction to have a front end thereof disposed above the hole 213.

Figure 7:
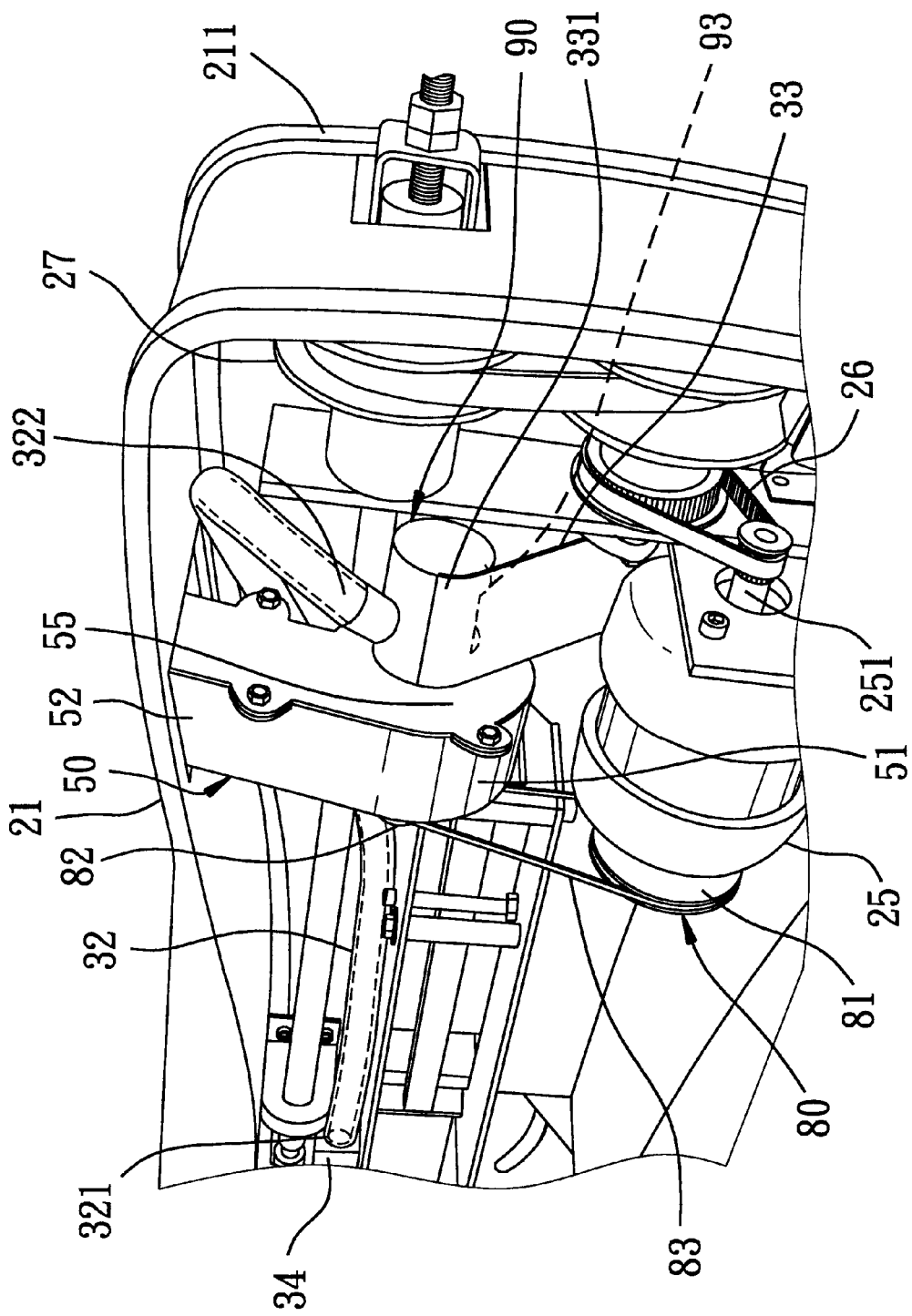
FIG. 7 is a fragmentary perspective view of a sawdust collecting mechanism of the preferred embodiment taken from a bottom side of the machine.
Figure 8:
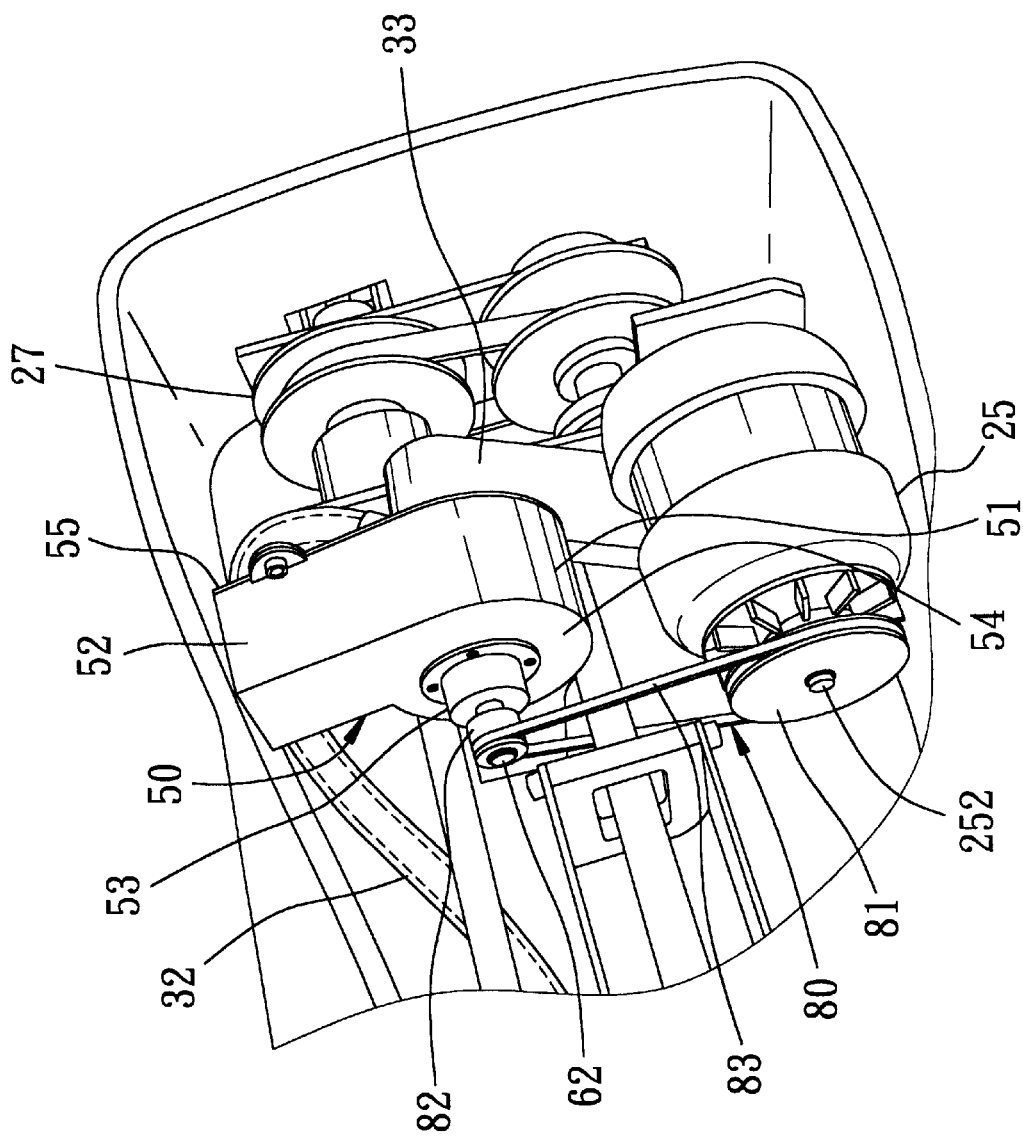
FIG. 8 is a fragmentary perspective view of the sawdust collecting mechanism of the preferred embodiment taken from a bottom side of the machine at another angle.
Figure 9:
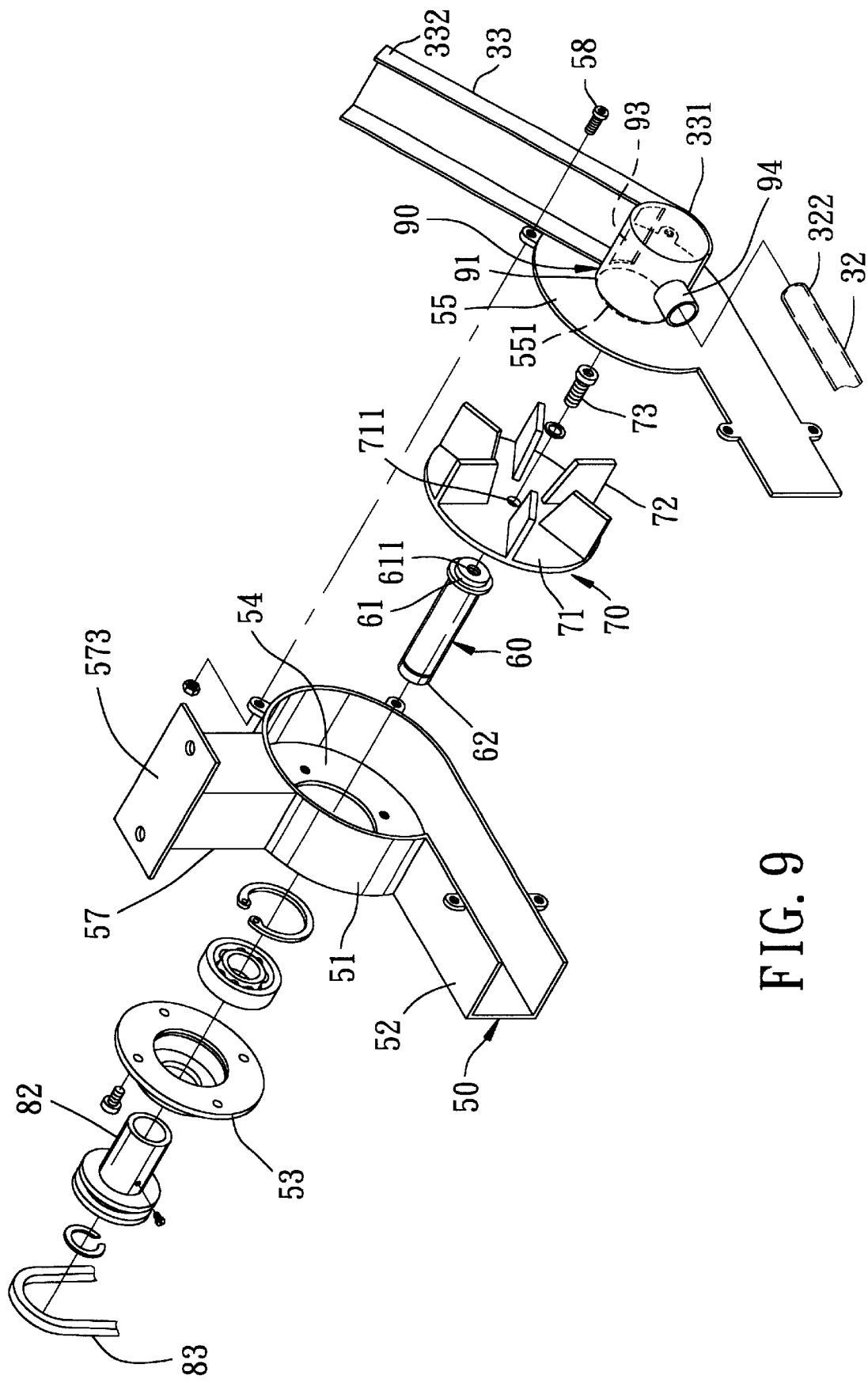
FIG. 9 is an exploded perspective view of a blowing member of the sawdust collecting mechanism.

With reference to FIGS. 7 and 8, a motor 25 is disposed in the base 21 under the table 211, and has first and second output shafts 251,252 which are disposed opposite to each other in the longitudinal direction to deliver driving forces.

A saw blade 241 extends through the hole 213, and has upper and lower ends opposite to each other in the upright direction.

Figure 6:
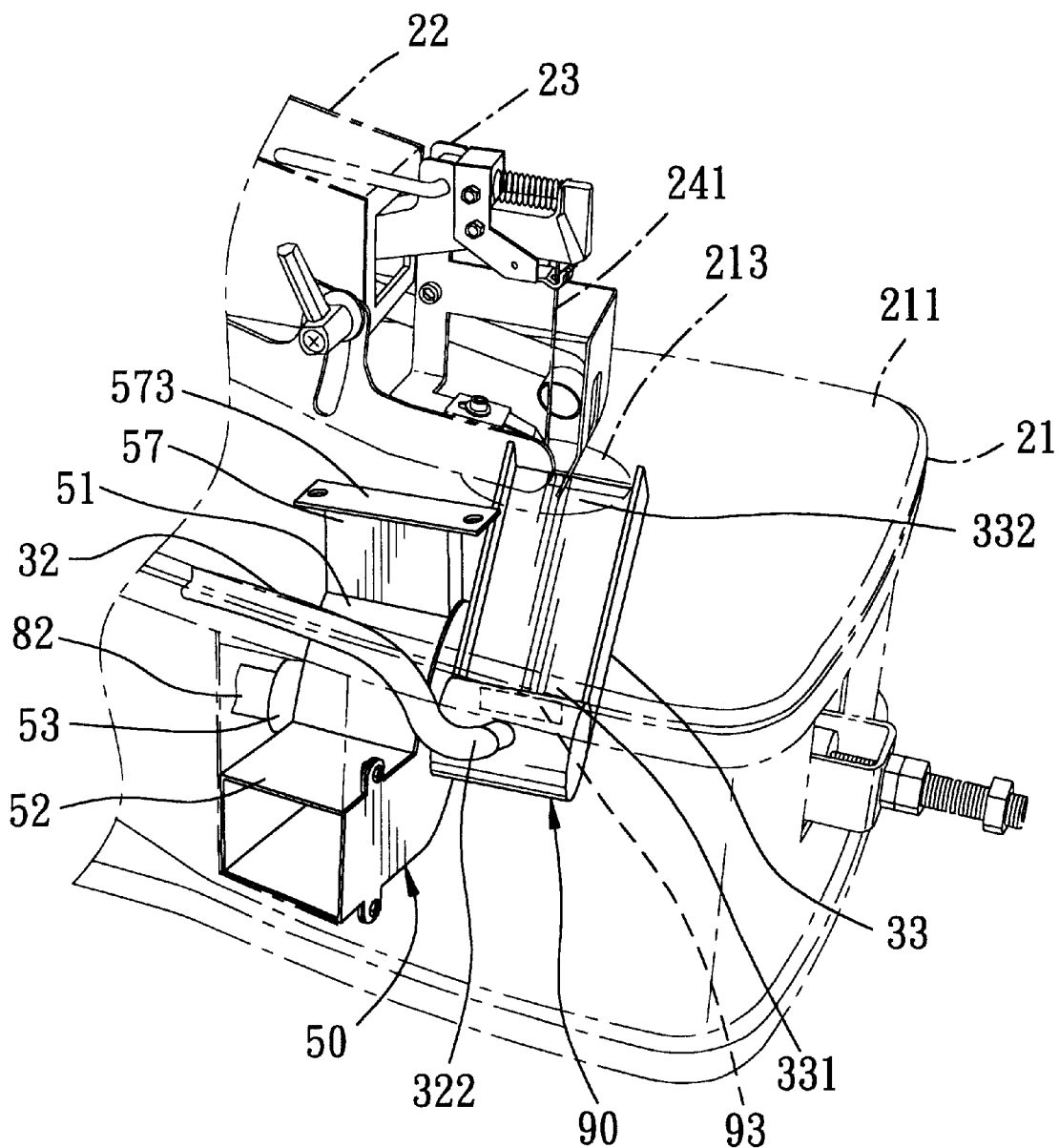
FIG. 6 is a fragmentary perspective view showing a portion of the preferred embodiment.

A blade-driving member 23 includes upper and lower driving portions which are mounted respectively above and under the table 211. As shown in FIG. 6, the upper driving portion is disposed in the arm 22 and has a forward end thereof extending outwardly of the front end of the arm 22 and connected to the upper end of the saw blade 241 in a known manner. The lower driving portion also has a forward end connected to the lower end of the saw blade 241 in a known manner. With reference to FIG. 7, the blade-driving member 23 is coupled to the first output shaft 251 of the motor 25 by means of a first transmission unit 26 and a shifting unit 27 in a known manner such that by virtue of the driving force of the first output shaft 251, the saw blade 241 is put into a reciprocating motion in the upright direction.

A sawdust collecting mechanism of the scroll sawing machine 20 according to this embodiment includes first and second sawdust collecting members 30,33, a blowing member 50, and a confluent chamber 90.

Referring to FIGS. 4, 6 and 7, the first sawdust collecting member 30 includes first and second connecting tubes 31,32 interconnecting each other to confine a first sawdust passageway therein. The first connecting tube 31 is a rigid tube, and has a first inlet end 311 which is disposed above the table 211 and in the vicinity of the hole 213 to collect sawdust emanating and scattering around and above the table 211 as a result of a sawing action, so as to serve as a first intake port, and a first outlet end 312 which extends from the first inlet end 311 towards and inwardly of the arm 22. The second connecting tube 32 is a flexible tube, and has a second inlet end 321 which is disposed in the arm 22 and which is connected to and communicated with the first outlet end 312 of the first connecting tube 31 via an adapter 34, and a second outlet end 322 which extends from the second inlet end 321 downwardly to be disposed under the table 211 so as to serve as a first outlet port.

Referring to FIG. 6, the second sawdust collecting member 33 is a chute confining a second sawdust passageway, and is disposed under the table 211 to collect sawdust falling through the hole 213. The second sawdust collecting member 33 has an upper end 332 which is disposed in the vicinity of the hole 213 to serve as a second intake port, and a lower end 331 which extends gradually and downwardly from the upper end 332 to be adjacent to the second outlet end 322 of the second connecting tube 32.

Referring to FIGS. 6, 7, 9 and 10, the confluent chamber 90 has two access openings 94,93 which are communicated with the second outlet end 322 of the second connecting tube 32 and the lower end 331 of the second sawdust collecting member 33, and an end opening 91 which extends therethrough in the longitudinal direction.

Referring to FIGS. 7, 8, 9 and 10, the blowing member 50 includes a blower casing 51, a drive shaft 60 and an impeller 70. The blower casing 51 has proximate and distal walls 55,54 respectively proximate to and distal from the confluent chamber 90 and opposite to each other in the longitudinal direction to confine an accommodation chamber 56, and a discharge port 52 which is disposed between the proximate and distal walls 55,54 and which is in communication with the accommodation chamber 56. The proximate wall 55 has an inlet port 551 which is formed therethrough and which is communicated with the end opening 91 in the confluent chamber 90. A bearing assembly 53 is mounted on the distal wall 54. In addition, the blower casing 51 further has an upper portion 57 with a locking plate 573 which is locked onto the base 21.

The drive shaft 60 extends in the longitudinal direction, and has a first end 61 which is rotatably mounted on the distal wall 54 via the bearing assembly 53 and which is formed with a screw hole 611, and a second end 62 which extends from the first end 61 and away from the distal wall 54 and which is coupled to and which is driven by the second output shaft 252 of the motor 25 via a second transmission unit 80. The second transmission unit 80 includes drive and driven pulleys 81,82 which are mounted to rotate with the second output shaft 252 and the second end 62, respectively, and a belt 83 which is trained on the drive and driven pulleys 81,82 to transmit rotating force of the second output shaft 252 to rotate the drive shaft 60 when the motor 25 is actuated.

The impeller 70 is received in the accommodation chamber 56, and includes a connecting plate 71 which is secured on the first end 61 of the drive shaft 60 by a screw 73 that passes through a hole 711 and that engages threadedly the screw hole 611 in the first end 61 so as to be driven by the drive shaft 60 to rotate a plurality of fins 72 on the connecting plate 71.

Figure 10:
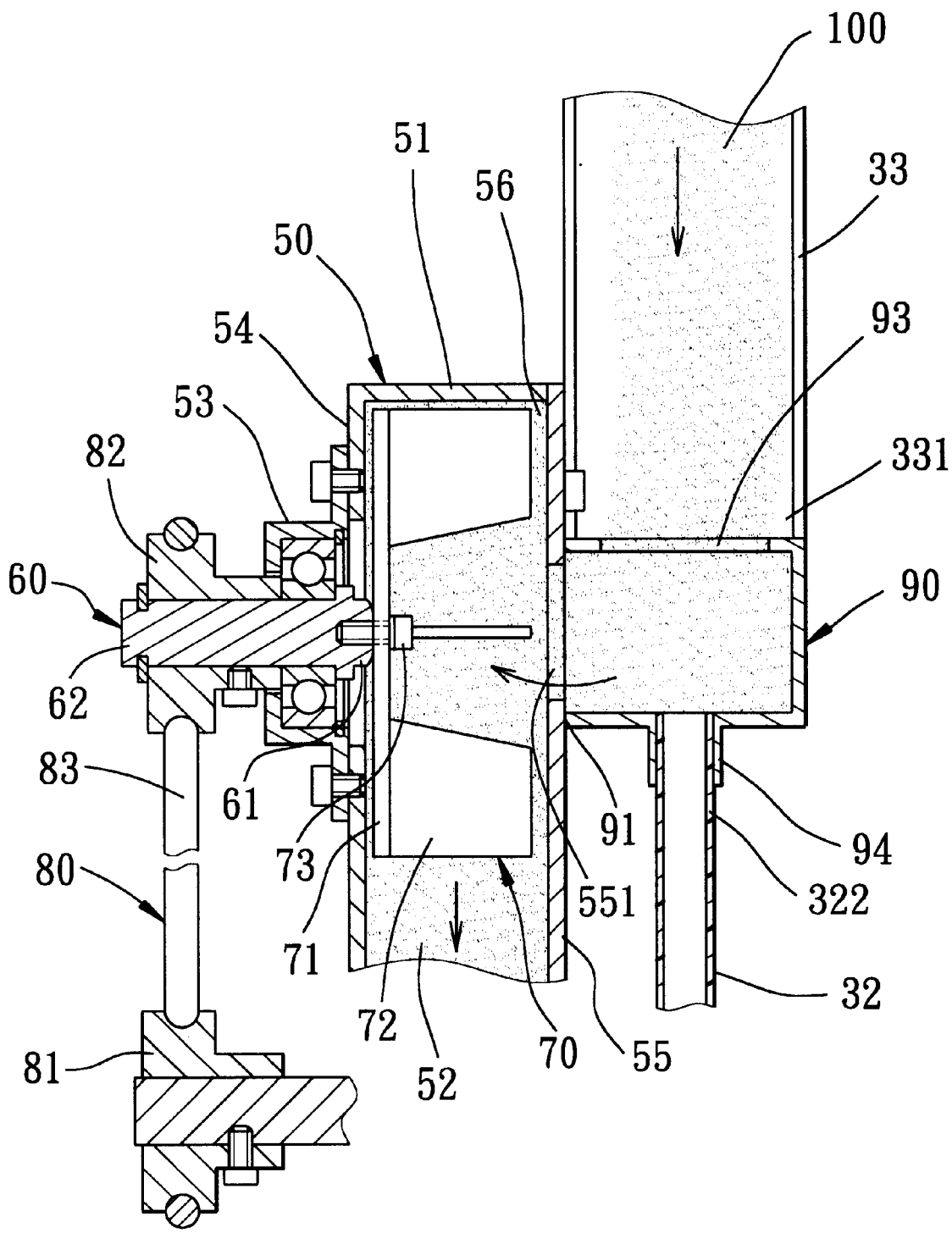
FIG. 10 is a sectional view showing how the blowing member is operated to draw sawdust.

With the construction as such, as shown in FIGS. 7, 8 and 10, operation of the motor 25 rotates the first and second output shafts 251,252, and simultaneously causes rotation of the impeller 70 via the drive shaft 60. Sawdust 100 can be drawn from the first and second sawdust passageways of the first and second collecting members 30,33 into the accommodation chamber 56 via the confluent chamber 90, and can be discharged via the discharge port 52. Moreover, a sawdust bag (not shown) is disposed to be connected to the discharge port 52. Therefore, by virtue of the first and second sawdust collecting members 30,32, sawdust emanating around and above the table 211 and falling through the hole 213 can be collected and discharged via the discharge port 52.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A scroll sawing machine comprising:
   a machine base; a table disposed above said machine base and adapted for placement of a workplace to be sawn thereon, said table having a hole which extends therethrough in an upright direction;
   a motor disposed under said table, and having first and second output shafts which are disposed opposite to each other in a longitudinal direction transverse to the upright direction to deliver driving forces;
   a saw blade extending through said hole, and having upper and lower ends opposite to each other in the upright direction;

a blade-driving member including upper and lower driving portions which are mounted respectively above and under said table and which respectively couple said upper and lower ends to said first output shaft such that by virtue of the driving force of said first output shaft, said saw blade is put into a reciprocating motion in the upright direction;

a first sawdust collecting member confining a first sawdust passageway, said first sawdust passageway having a first intake port disposed above said table and in the vicinity of said hole to collect sawdust emanating and scattering around and above said table as a result of a sawing action, and a first outlet port disposed under said table and downstream of said first intake port;

a second sawdust collecting member disposed under said table and confining a second sawdust passageway, said second sawdust passageway having a second intake port disposed under said table and in the vicinity of said hole to collect sawdust falling through said hole, and a second outlet port disposed downstream of said second intake port and adjacent to said first outlet port;

a blower casing having proximate and distal walls which are respectively proximate to and distal from said second outlet port and which are disposed opposite to each other in the longitudinal direction to confine an accommodation chamber, and a discharge port which is disposed between said proximate and distal walls and which is in communication with said accommodation chamber, said proximate wall having an Inlet port which is formed therethrough and which is disposed downstream of said first and second outlet ports; a drive shaft extending in the longitudinal direction, and having a first end which is rotatably mounted on said distal wall, and a second end which extends from said first end and outwardly of said distal wall and which is coupled to and which is driven by said second output shaft;

an impeller received in said accommodation chamber, and connected to and driven by said first end of said drive shaft to rotate so as to drew the sawdust from said first and second sawdust collecting members into said accommodation chamber for discharge vie said discharge port; and a hollow cantilever arm extending in the longitudinal direction and having a front end which is disposed above said hole, and wherein said upper driving portion is provided with a forward end, and is disposed within said arm such that said forward end extends outwardly of said front end of said arm to couple said upper end of said saw blade to said first output shaft;

wherein said first sawdust collecting member includes a first connecting tube having a first inlet end which serves as said first intake port, and a first outlet end which extends from said first inlet end towards and inwardly of said arm, a second connecting tube having a second inlet end which is disposed in said arm to be communicated with said first outlet end, and a second outlet end which extends from said second inlet end downwardly to be disposed under said table so as to serve as said first outlet port;

wherein said second sawdust collecting member includes a chute having upper and lower ends which serve as said second intake port and said second outlet port, respectively, and inclining gradually and downwardly from said upper end to said lower end.

2. The scroll sawing machine of claim 1, further comprising a confluent chamber disposed upstream of said inlet port, and downstream of both said first and second outlet ports so as to gather the sawdust drawn from said first and second sawdust collecting members.

3. The scroll sawing machine of claim 1, wherein said blower casing has an upper portion which is anchored on said machine base so as to secure said blower casing under said table.

* * * * *